Patented Aug. 25, 1931

1,820,172

UNITED STATES PATENT OFFICE

FRANK AYER AND ARTHUR CROWFOOT, OF MORENCI, ARIZONA, ASSIGNORS OF FIFTY-FIVE ONE-HUNDREDTHS TO PHELPS DODGE CORPORATION, A CORPORATION OF NEW YORK

PROCESS FOR CONCENTRATING ORES

No Drawing.     Application filed June 13, 1929. Serial No. 370,732.

This invention consists of a means for concentrating ores or ore products, such as tailings, classifier overflow, fines, slimes, or flotation middlings, by a combination of leaching and flotation methods having particular reference to the recovery of copper values occurring in the form of sulphides or as oxides or other acid soluble compounds. Although this invention may be used advantageously when the copper values occur as sulphide or as oxide or predominatingly as sulphide or as oxide, it has particular advantage in the recovery of copper values from ores containing mixed sulphide and oxide copper or other acid soluble compounds thereof. The difficulties encountered in the treatment of oxides or other acid soluble compounds of copper by flotation methods and sulphides of copper by leaching methods are well understood. In treating a mixed copper ore containing both sulphides and oxides, high percentages of the oxides are lost by the flotation method and high percentages of the sulphides are lost by acid leaching.

Attempts have been made to treat such mixed ore by dissolving the acid soluble copper in the pulp, precipitating the dissolved copper in the form of metallic copper back into the pulp and subjecting the pulp then containing metallic and sulphide copper to flotation. Such proposed methods have not received commercial application for various reasons, principally because the copper was not precipitated in a form readily amenable to flotation and because of the time consumed and the extensive and expensive equipment required to separate the dissolved acid soluble copper compounds from the gangue.

We have designed our process for the purpose of overcoming the difficulties present in the other known methods. Our process consists in producing, by means of a dilute solution of a solvent in quantity and strength requisite to the process, a thick pulp of the material to be treated. The pulp should be as dense as is consistent with carrying out the process; in practice, a pulp of 80% solids has given efficient results. The quantity of acid is determined by the characteristics of the material to be treated. The pulp is passed continuously through a rotating mixing cylinder. The rotation of the mixing cylinder produces an intimate contact between the solvent and the mineral to be treated and induces the passage of the pulp through the cylinder, during which the active dissolution of the acid soluble mineral proceeds. The lining of the cylinder may be of an acid resisting material, in order to prevent corrosion of the cylinder and to avoid unnecessary consumption of acid. To bring about the dissolution of all possible acid soluble minerals, it is important that the maximum amount of contact of acid with the mineral to be treated be afforded in the mixing cylinder. This is effected by controlling the speed of the progress of the pulp through the mixing cylinder by regulating its inclination, length and rate of rotation, according to the requirements of the material to be treated. It has been found with an ore ground to six-mesh size and containing seven pounds of acid soluble copper to the ton, that a mixing period of ten minutes is sufficient. The pulp is passed continuously from the mixing cylinder into a grinding mill or series of grinding mills containing iron balls, iron rods, or other shapes or iron grinding media which will comminute the material to be treated and concurrently with comminution, act as a precipitant for the metal in solution, which it is desired to precipitate. The linings of the grinding apparatus may be of a precipitant or non-precipitant material, as preferred. In the grinding apparatus, the comminution of the material to be treated proceeds continuously and concurrently with solution of the acid soluble portions thereof, with precipitation in elemental form of the metal or metals in solution on the surface of the grinding media, and with removal of the precipitated material from the grinding media by abrasion and attrition, whereby a pulp is formed which is particularly amenable to flotation.

The pulp is fed to the grinding mill at such a rate as to accomplish most efficiently the process as above described.

The pulp containing the finely divided precipitated metal in elemental form, the clean sulphides, if any, the gangue and other original ingredients of the material treated, are passed continuously from the grinding apparatus and diluted by the addition of water to form a pulp of a density suitable for treatment by the flotation process.

The diluted pulp may be sent directly to flotation treatment but preferably is introduced into a classifier, the sand product of which is returned to the grinding apparatus and the overflow product of which is subjected to flotation treatment.

This process affords a highly efficient method of precipitation of metallic copper in a pulp and in form amenable to flotation. An important feature of this process is that as the finely divided copper in elemental form is removed continuously from the surfaces of the grinding media, fresh surfaces on the grinding media are constantly exposed for the the continued precipitation of metallic copper. The iron commonly wasted in grinding is put to profitable use and supplies a substantial part of the required precipitant. Where grinding media are required for the comminution of ore, iron for the purpose of precipitation may be afforded more economically and generally more efficiently from the grinding media as above described than by supplying a specially prepared precipitant.

Sulphides, occurring either originally alone, or in combination with oxides, often become coated with an oxide film or slime coating, which renders the sulphide refractory to recovery by the flotation process. Subjecting the filmed or coated sulphide to the action of the solvent in the mixing cylinder and in the grinding apparatus removes the refractory film or coating and greatly improves amenability of the sulphide to recovery by the flotation process, and, in addition, what oxide is present in the film or the coating is recovered by the process.

In the treatment of ores containing sulphide and acid soluble copper, we prefer to begin the treatment by coarse crushing the ore. The product of the coarse crushing is pulped and subjected to the proces as above described.

In the treatment of Phelps Dodge ores at Morenci, Arizona, containing approximately 6.8 pounds of acid soluble copper to the ton and 31.2 pounds of sulphide copper to the ton, the ore was crushed to a 6-mesh size, a thick pulp was made by the addition of a dilute solution of sulphuric acid (3%), the pulp was thoroughly mixed for ten minutes and passed through a ball mill and ground for a period of ten minutes to minus 65-mesh size. The ball mill product was diluted to a consistency suitable for flotation treatment, flotation agents added, and the whole pulp passed through a flotation operation. By this method 86.41 per cent of the acid soluble copper contained in the ore was dissolved in the mixing and grinding operation, precipitated on the grinding media in the grinding mill, ground off of the grinding media during the continued comminution of the pulp in a form amenable to flotation and recovered by flotation; 95.85 per cent of the sulphide copper contained in the ore was recovered. This gave a recovery of 94.17 per cent of the total copper contained in the ore.

Subjecting the same ore ground to the same fineness to the standard flotation process carried out under the most efficient known conditions for this type of ore, the extraction was 34.32 per cent of the acid soluble copper, 92.25 per cent of the sulphide copper or an extraction of 81.88 per cent of the total copper in the ore. There was a comparative advantage in favor of our process upon this type of ore of 52.09 per cent on acid soluble copper, 3.60 per cent on sulphide copper, and 12.29 per cent on extraction of total copper contained in the ore.

The above comparative results are tabulated as follows:

Table 1

|  | Standard method | Our method |
|---|---|---|
| Assays—per cent: |  |  |
| Feed—Total Cu | 1.90 | 1.90 |
| Acid soluble Cu | 0.34 | 0.34 |
| Sulphide Cu | 1.56 | 1.56 |
| Tailing—Total Cu | 0.37 | 0.12 |
| Acid soluble Cu | 0.24 | 0.05 |
| Sulphide Cu | 0.13 | 0.07 |
| Concentrate—Total Cu | 22.30 | 23.48 |
| Extraction—per cent: |  |  |
| Total Cu | 81.88 | 94.17 |
| Acid soluble Cu | 34.32 | 85.11 |
| Sulphide | 92.25 | 95.35 |

This improved extraction is due to the described method of dissolving and precipitating the acid soluble copper as to the oxide copper and to the removal of the sulphide film or slime coating as to the sulphide copper, and for these reasons, a corresponding advantage in extraction is obtainable in the treatment of any comparable ore containing sulphide and/or acid soluble copper.

Dump or stacked sand tailings or slime tailings containing sulphide and/or acid soluble copper are refractory to treatment for recovery of the copper content. Such material is not amenable to efficient treatment by flotation processes as commonly in use on account of the presence of acid soluble compounds (such as oxides, sulphates, carbonates and silicates), and filmed or coated sulphides. Difficulties are experienced in efficiently treating finely divided slimes and sand tailings containing copper in different acid soluble and/or sulphide forms by the leaching process on account of expensive plants and high operating costs required and encountered in separating the enriched liquors from the fine sands or slimes. Furthermore, certain sulphides of copper, such as chalcopyrite, bornite, or covellite, cannot be leached economically. Our process overcomes all of these difficulties, and in addition, recovers the gold and silver present and any desired sulphides occurring in the ore. The tailings are pulped in the presence of dilute sulphuric acid and subjected to the process as above described. The acid soluble copper is dissolved and precipitated, the film or coating on the sulphides is removed, and the precipitated metallic copper and the sulphide copper recovered from the pulp by the flotation process. This application of our process dispenses with the expensive plants and costly operation of the other methods of treatment of such material and recovers certain sulphides which cannot be extracted economically by the leaching process.

At Morenci, Arizona, stacked tailings have been treated by our process and also by the standard flotation process carried out under the most efficient known conditions. The comparative results are tabulated as follows:

Table 2

|  | Standard method | Our method |
|---|---|---|
| Assays— per cent: |  |  |
| Feed—Total Cu | 0.65 | 0.65 |
| Acid soluble Cu | 0.51 | 0.51 |
| Sulphide Cu | 0.14 | 0.14 |
| Tailing—Total Cu | 0.47 | 0.10 |
| Acid soluble Cu | 0.40 | 0.05 |
| Sulphide Cu | 0.07 | 0.05 |
| Concentrate—Total Cu | 2.26 | 12.50 |
| Extraction—per cent: |  |  |
| Total Cu | 34.96 | 85.30 |
| Acid soluble Cu | 29.45 | 90.63 |
| Sulphide | 55.07 | 65.86 |

As shown above, there was a comparative advantage in favor of our process in the treatment of this tailing of, 61.18 per cent on acid soluble copper, 10.79 per cent on sulphide copper, and 50.34 per cent on extraction of total copper.

In the treatment of certain types of copper ores, it has been found advantageous at certain properties using a variety of processes to remove from the feed to the system employed for the treatment of such ores, a portion of the ores in the shape of fines which contain sulphide and/or acid soluble copper in substantial quantities. In many instances in such operations, this segregated fines product is stacked and held awaiting a satisfactory method of treatment. The copper contained in the segregated fines may be recovered more economically and efficiently by our process than by any other known method. Such fines are pulped with a dilute sulphuric acid solution and subjected to the process as above described.

In the treatment of certain types of ores containing sulphide and/or acid soluble copper, it is advantageous to coarse crush the ore, pulp the product and pass through a classifier. The sand product of the classifier is fed to the standard comminution, concentration, flotation, or leaching processes. The overflow product of the classifier is thickened, sulphuric acid added, and the thickened pulp introduced into the mixing cylinder, and our process carried out as above described. It has been found that the classifier overflow product can be so controlled, as to contain 55 per cent or more of the acid soluble copper in the ore and not to exceed 25 per cent of the original ore solids. The overflow product also contains a marked concentration of finely divided coated or filmed sulphides refractory to the ordinary methods of flotation. Our process effects a substantial saving of the acid soluble copper which would be lost in the ordinary flotation process and by removing the oxide film or slime coating, improves sulphide recovery.

Segregated fines from Morenci, Arizona, ores have been treated by this variation of our process and also by the standard flotation process carried out under the most efficient known conditions. The comparative results were as follows:

Table 3

|  | Standard method | Our method |
|---|---|---|
| Assays—per cent: |  |  |
| Feed—Total Cu | 1.760 | 1.698 |
| Acid Soluble Cu | 0.670 | 0.634 |
| Sulphide Cu | 1.090 | 1.064 |
| Tailing—Total Cu | 0.858 | 0.190 |
| Acid soluble Cu | 0.584 | 0.075 |
| Sulphide Cu | 0.274 | 0.115 |
| Concentrate—Total Cu | 11.852 | 16.681 |
| Extraction—per cent: |  |  |
| Total Cu | 55.250 | 89.829 |
| Acid soluble Cu | 19.985 | 89.257 |
| Sulphide | 76.927 | 90.169 |

As shown above, there was a comparative advantage in favor of our process in the treatment of these segregated fines, at Morenci, Arizona, of, 69.27 per cent on acid soluble copper, 13.24 per cent on sulphide copper, and 34.58 per cent on extraction of total copper.

In the usual flotation practice, a flotation concentrate is made as high in grade as possible by submitting it to one or more subsequent flotation treatments in cleaner cells. The tailing (commonly called middling) product of these cleaner cells contains high percentages of acid soluble and sulphide copper refractory to recovery in the cleaning operation. This product is returned usually to the head of the flotation system. In this manner the acid solubles and sulphides in the middling are recirculated in the flotation system. It is well known that a high percentage of such values are lost in the flotation tailing because of the nature of the values, refractory to recovery by the flotation process. This refractory product may be treated by our process as in the case of primary slimes and with corresponding advantages and may form a part of the same operation and proceed concurrently with the treatment of primary slimes by our process as above described.

The middling product of the standard flotation process carried on at Morenci, Arizona, has been treated by our process as above described, and also by the standard flotation process carried out under the most efficient known conditions. The comparative results were as follows:

Table 4

|  | Standard method | Our method |
|---|---|---|
| Assays—Per cent: |  |  |
| Feed—Total Cu | 3.54 | 3.54 |
| Acid soluble Cu | 0.55 | 0.55 |
| Sulphide Cu | 2.99 | 2.99 |
| Tailing—Total Cu | 0.95 | 0.21 |
| Acid soluble Cu | 0.44 | 0.07 |
| Sulphide Cu | 0.51 | 0.14 |
| Concentrate—Total Cu | 14.86 | 23.90 |
| Extraction—Per cent: |  |  |
| Total Cu | 78.16 | 94.90 |
| Acid soluble Cu | 34.89 | 89.05 |
| Sulphide | 86.12 | 95.97 |

As shown above, there was a comparative advantage in favor of our process in the treatment of the middling, at Morenci, Arizona, of, 54.16 per cent on acid soluble copper, 9.85 per cent on sulphide copper, and 16.74 per cent on extraction of total copper.

In carrying out our process or any of the variations thereof in certain operations, a separate mixing apparatus may be dispensed with, and the mixing, as described, carried on in the grinding apparatus. In such case, the grinding apparatus serves as the mixer and in it go on continuously, simultaneously, and concurrently, mixing the ore with dilute solvent and forming a dense pulp, dissolution of the acid soluble minerals, removal of film and slime coating from the surfaces of sulphide minerals, comminution of the ore or material treated, precipitation of the metal from solution on the surfaces of the grinding media, and the removal of the metal so precipitated from the surfaces of the grinding media by the abraison and attrition of the grinding media and the pulp, in finely divided form readily amenable to recovery by flotation.

This process may also be carried out by comminuting the ore or material to be treated prior to the introduction of the solvent, dissolving the acid soluble mineral, and introducing the comminuted pulp containing the dissolved mineral into a suitable apparatus or series of apparatus containing a media for the precipitation of the mineral in solution upon the surfaces of the precipitant media. The apparatus is then rotated so that the metal precipitated is removed from the surfaces of the precipitant media by the attrition and abraison of the precipitant media and the pulp, within the apparatus, in a form readily amenable to recovery by flotation.

Our invention is capable of application in a great variety of ways and we do not limit ourselves to the applications and variations of our invention as above described.

What we claim is,

1. A method for the preparation of refractory ores for subsequent treatment by flotation, said ores containing constituents separately amenable and unamenable to separation by flotation, which comprises treating the ore with a solvent to dissolve a portion of the ore unamenable to flotation, and simultaneously comminuting the ore mass in the presence of a metal which will precipitate out metal values from the dissolved portion of the ore, which metal values are freed in elemental form and rendered amenable to flotation.

2. A method for the preparation of refractory ores for subsequent treatment by flotation, said ores containing constituents separately amenable and unamenable to separation by flotation, which comprises treating the ore with a solvent to dissolve that portion of the ore unamenable to flotation, and simultaneously grinding the ore mass by means of bodies of metal which will plate out metal values from the dissolved portion, which values in the grinding process are freed from said bodies in finely divided elemental form and rendered amenable to flotation.

3. A method for the preparation of refractory ores for subsequent treatment by flotation, said ores containing constituents separately amenable and unamenable to separation by flotation, which comprises subjecting the ore to acid treatment to dissolve portions of the ore unamenable to flotation and simultaneously comminuting the ore by means of grinding with metal bodies of a metal which will displace the metal values in solution, causing elemental metal values to be separated which in the grinding action will be freed and rendered amenable to flotation.

4. A method for the preparation of refractory copper ores for subsequent treatment by flotation, said ores containing constituents as copper sulphide and copper oxide separately amenable and unamenable, respectively, to separation by flotation, which comprises treating the ore with a solvent to dissolve the copper oxide constituent and simultaneously comminuting the ore by means of metal bodies of a metal which will displace the copper in solution, causing elemental copper to be thrown out on the metal bodies and rendered amenable to flotation.

5. A method for the preparation of refractory copper ores for subsequent treatment by flotation, which ores contain constituents separately amenable and unamenable to separation by flotation, which comprises dissolving a portion of the ore by means of acid to form a pulp having metal value in solution, and simultaneously with the solution of the metal values grinding the ore by means of iron bodies to comminute the ore and to expose new surfaces for treatment with acid, whereby the metal values are precipitated out by the iron and freed in elemental form amenable to flotation.

6. A method for the preparation of copper ores containing copper sulphide and acid-soluble copper for subsequent treatment by flotation which comprises treating the ore with acid to dissolve the acid-soluble copper to form a solution thereof and simultaneously grinding the ore with iron bodies to comminute the ore and to precipitate out the dissolved copper from the solution, whereby solution and precipitation takes place progressively, the separated elemental copper being freed from the surfaces of the iron bodies during the said grinding, whereby the mass is rendered amenable to separation of the metal values by flotation.

7. A method for the preparation of copper ores containing copper sulphide and copper oxide for treatment by flotation which comprises treating the ore with a sulphuric acid solution to dissolve out the copper oxide and simultaneously grinding the ore by means of iron bodies in the presence of the said solution to comminute the ore and to throw out copper from the solution, the separated elemental copper being freed from the surfaces of the iron bodies through the grinding operation, whereby the mass is rendered amenable to separation of the metal values by flotation.

8. A method for the recovery of metal values from refractory ores containing constituents separately amenable and unamenable to separation by flotation, which comprises adding an acid to the ore, grinding the ore in the presence of the acid with a grinding medium electro-positive to the metal values dissolved by the said acid and continuing the comminuting by grinding until the recovery values are substantially completely amendable to flotation and thereafter separating the metal values by flotation.

9. A method for the recovery of copper from refractory ores containing a compound of copper soluble in a solution medium, which comprises comminuting the ore in the presence of the said solution medium and in the presence of metal electro-positive to copper, whereby during the comminuting of the said ore the soluble copper constituents will be dissolved and the copper progressively thrown out of solution by means of the said electro-positive metal, thereby rendering the copper amenable to separation by flotation and finally separating the copper by flotation from undesired constituents of the ore.

FRANK AYER.
ARTHUR CROWFOOT.